US012699339B2

(12) United States Patent
Nakajima et al.

(10) Patent No.: US 12,699,339 B2
(45) Date of Patent: Aug. 4, 2026

(54) MOVABLE CLEANING DEVICE

(71) Applicant: Hewlett-Packard Development Company, L.P., Spring, TX (US)

(72) Inventors: Kensuke Nakajima, Yokohama (JP); Satoru Hori, Yokohama (JP); Koji Miyake, Yokohama (JP); Shun Ikeura, Yokohama (JP)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 19/104,612

(22) PCT Filed: Dec. 19, 2022

(86) PCT No.: PCT/US2022/053419
§ 371 (c)(1),
(2) Date: Feb. 18, 2025

(87) PCT Pub. No.: WO2024/039391
PCT Pub. Date: Feb. 22, 2024

(65) Prior Publication Data

US 2026/0064044 A1 Mar. 5, 2026

(30) Foreign Application Priority Data

Aug. 19, 2022 (JP) ................................ 2022-131212

(51) Int. Cl.

| | |
|---|---|
| ***G03G 15/00*** | (2006.01) |
| ***G03G 15/16*** | (2006.01) |
| ***G03G 21/00*** | (2006.01) |

(52) U.S. Cl.
CPC ....... *G03G 15/161* (2013.01); *G03G 15/6529* (2013.01); *G03G 21/0076* (2013.01); *G03G 2215/1661* (2013.01)

(58) Field of Classification Search
CPC ............. G03G 15/161; G03G 15/6529; G03G 21/0005; G03G 21/0011; G03G 21/0076; G03G 21/0082; G03G 2215/1661
See application file for complete search history.

(56) References Cited

U.S. PATENT DOCUMENTS 8,238,790 B2 * 8/2012 Furuya ............... G03G 21/1647
399/121

FOREIGN PATENT DOCUMENTS

| | | |
|---|---|---|
| JP | 63-278087 A | 11/1988 |
| JP | 03-243977 A | 10/1991 |
| JP | 2006-227130 A | 8/2006 |
| JP | 2012-133263 A | 7/2012 |
| JP | 2012-252151 A | 12/2012 |
| JP | 2016-071318 A | 5/2016 |
| JP | 2022-021454 A | 2/2022 |

* cited by examiner

*Primary Examiner* — Sophia S Chen
(74) *Attorney, Agent, or Firm* — Foley & Lardner LLP

(57) ABSTRACT

A cleaning device includes a contact member that contacts a rotation surface and a lever device which displaces the contact member. The lever device includes a roller which contacts the rotation surface and a lever which supports the roller to rotate in response to a forward rotation of the rotation surface. The lever is displaced by receiving a force of the rotation surface through the roller and separates the contact member from the rotation surface, in response to a backward rotation of the rotation surface.

15 Claims, 13 Drawing Sheets

MOVABLE CLEANING DEVICE

CROSS-REFERENCE TO RELATED APPLICATIONS

This application is a U.S. National Stage Entry under 35 U.S.C. § 371 of International Application No.: PCT/US2022/053419, filed Dec. 19, 2022 which claims priority to JP Patent Application No.: 2022-131212 filed on Aug. 19, 2022 both of which is hereby incorporated by reference in their entirety.

BACKGROUND

An image forming system includes a conveying device which conveys a print medium, a photoreceptor on which an electrostatic latent image is formed, a developing device which develops an electrostatic latent image, a transfer device which transfers a toner image to a print medium, a fixing device which fixes a toner image to a print medium, and a discharge device which discharges a print medium. For example, the transfer device may include a cleaning device for removing a remaining toner.

DETAILED DESCRIPTION

Figure 1:
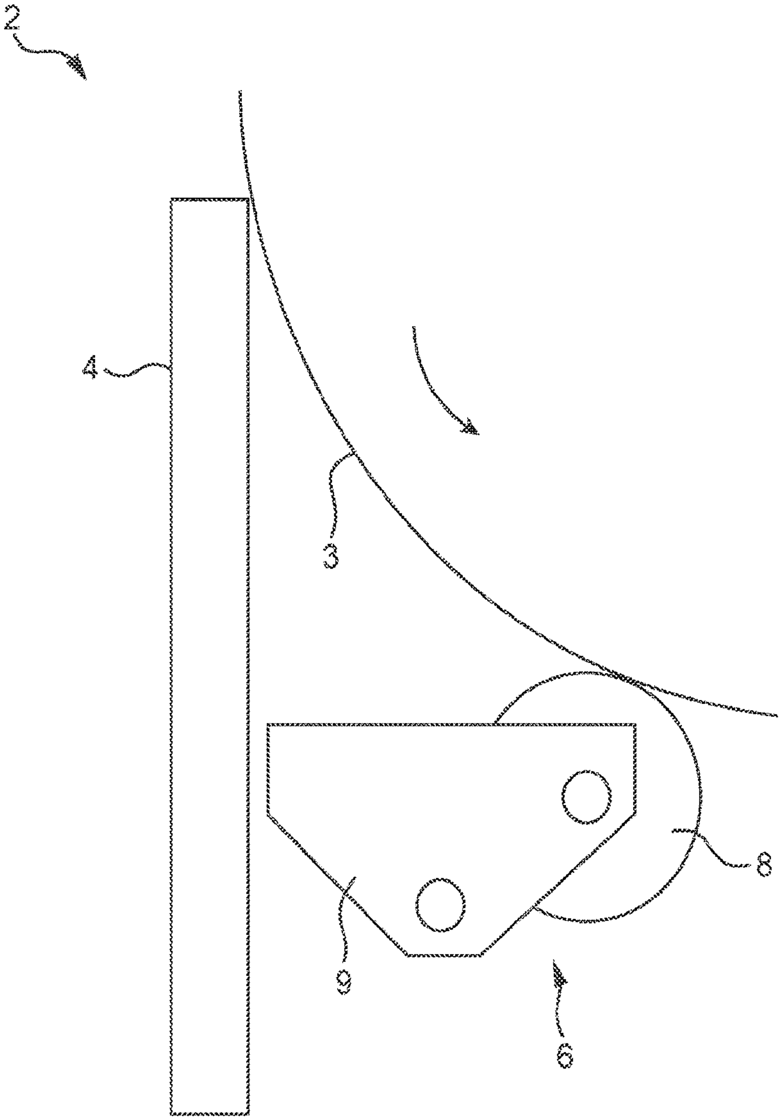
FIG. 1 is a schematic view of an example movable cleaning device, in accordance with some examples.

Hereinafter, an example image forming apparatus including a conveying device and a movable cleaning device is described with reference to the drawings. In the following description and the drawings, like reference numerals generally indicate identical, functionally similar, and/or structurally similar elements, and overlapping description may be omitted. Further, the terms "clockwise" and "counterclockwise" are defined as viewed from the front of the paper surface of FIGS. 6, 7, 9, 10, 11, 12, and 13.

Figure 2:
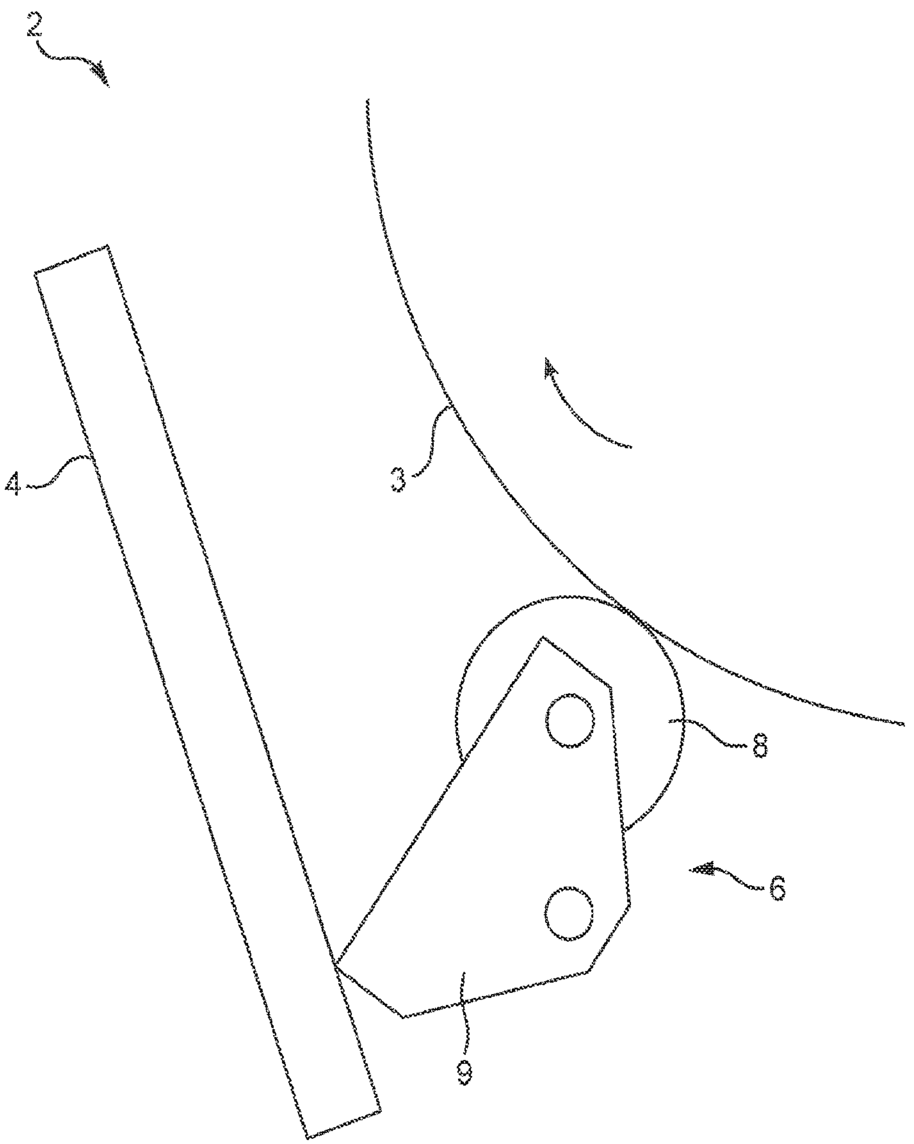
FIG. 2 is a schematic view of an example movable cleaning device, in accordance with some examples.

FIGS. 1 and 2 are diagrams conceptually or schematically showing an example movable cleaning device, in accordance with some examples. A movable cleaning device 2 according to the present disclosure includes a contact member 4. The contact member 4 can contact a rotation surface 3. A lever device 6 includes a roller 8 and a lever 9. The lever device 6 can displace the contact member 4. The roller 8 can contact the rotation surface 3, and the lever 9 can support the roller 8 to rotate in response to the rotation of the rotation surface 3. The lever 9 is axially supported to be rotatable.

When the rotation surface 3 rotates forward (i.e., counterclockwise) as shown in FIG. 1, the lever 9 displaces the contact member 4 to a position such that the contact member 4 contacts the rotation surface 3 by receiving the force of the rotation surface 3 transmitted to the lever 9 by the friction force of the roller 8. When the rotation surface 3 rotates backward (i.e., clockwise) as shown in FIG. 2, the lever 9 displaces the contact member 4 to a position where the contact member 4 separates from the rotation surface 3 by receiving the force of the rotation surface 3 transmitted to the lever 9 by the friction force of the roller 8.

Referring to the movable cleaning device 2, the roller 8 causes the lever 9 to axially rotate by transmitting the force from the rotation surface 3 in response to the forward rotation or the backward rotation of the rotation surface 3. The contact member 4 contacts the rotation surface 3 when the rotation surface 3 rotates forward (i.e., counterclockwise), and the contact member 4 separates from the rotation surface 3 when the rotation surface 3 rotates backward (i.e., clockwise). Since the contact member 4 contacts the rotation surface 3 in response to the forward rotation of the rotation surface 3, the constant contact of the contact member 4 with the rotation surface 3 can be avoided. Further, since the lever device 6 uses the roller 8 to transmit the force from the rotation surface 3 to the lever 9, the friction between the rotation surface 3 and the lever device 6 is suppressed.

Figure 3:
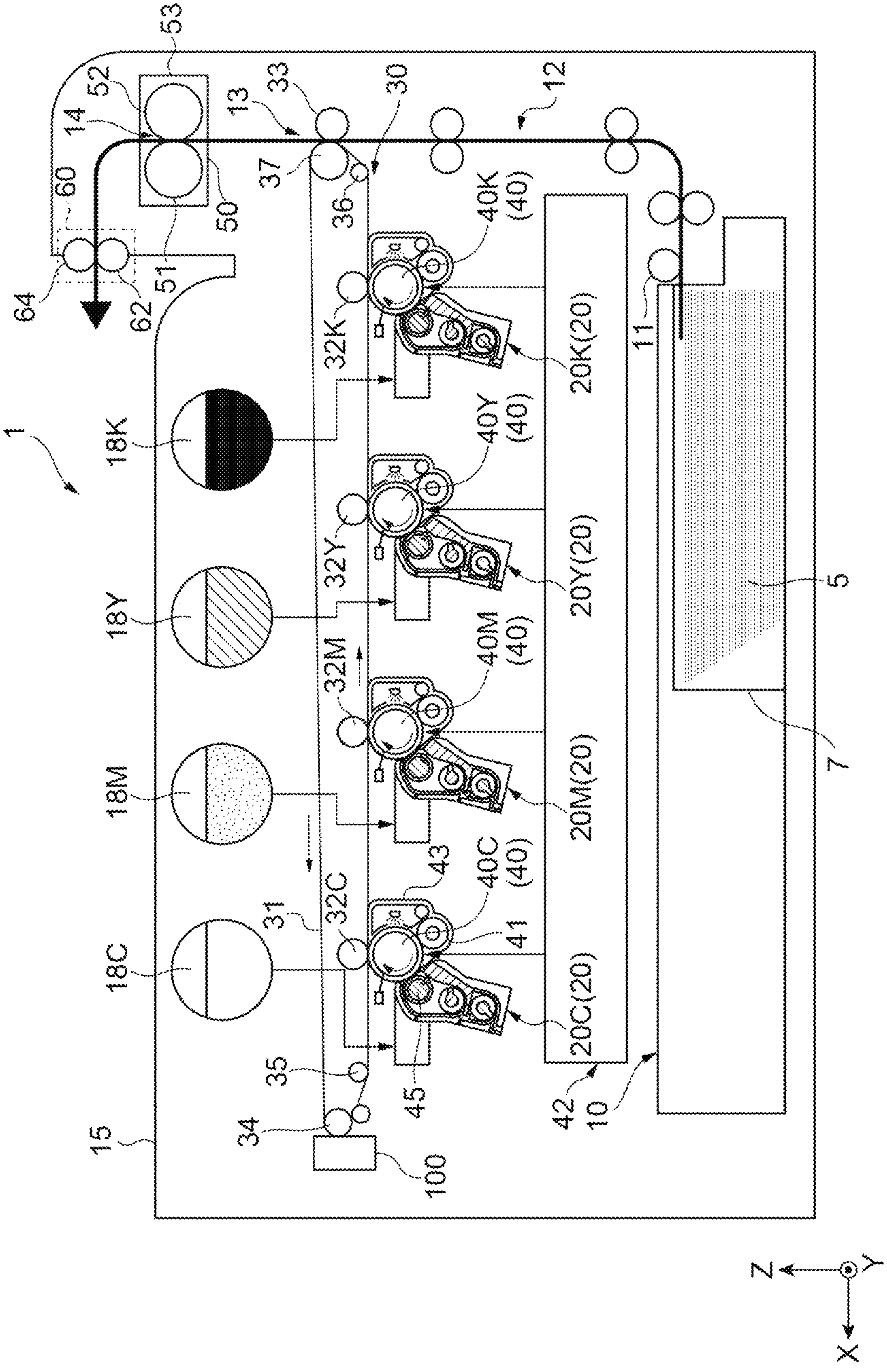
FIG. 3 is a schematic view of an example image forming apparatus, in accordance with some examples.

In FIG. 3, shown is a schematic diagram of an example image forming apparatus. The image forming apparatus 1 shown in FIG. 3 is an apparatus that forms a color image by using cyan, magenta, yellow, and black colors. The image forming apparatus 1 includes a conveying device 10 which conveys a sheet 5 corresponding to a print medium, a plurality of developing devices 20C, 20M, 20Y, and 20K (hereinafter, referred to as a "developing device 20" when it is not necessary to distinguish individual components) which develop electrostatic latent images, a transfer device 30 which transfers a toner image of each color to the sheet 5, a plurality of photoreceptors 40C, 40M, 40Y, and 40K (hereinafter, referred to as a "photoreceptor 40" when it is not necessary to distinguish individual components) which form electrostatic latent images on surfaces, a fixing device 50 which fixes a layered toner image to the sheet 5, and a discharge device 60 which discharges the sheet 5. The conveying device 10, the developing device 20, the transfer device 30, the photoreceptor 40, the fixing device 50, and the discharge device 60 are included in a housing 15 of the image forming apparatus 1.

The conveying device 10 conveys the sheet 5 corresponding to the print medium on which an image is to be formed on a conveying route 12. A stack of the sheet 5 is stored in a cassette 7, and one of the sheet 5 is picked up and conveyed by a feeding roller 11. The conveying device 10 conveys the sheet 5 to a transfer region 13 through the conveying route 12 when a toner image to be transferred to the sheet 5 reaches the transfer region 13.

The developing devices 20C, 20M, 20Y, and 20K are provided for each color. Each developing device 20 includes a developing roller 45 that carries a toner in the photoreceptor 40. In the developing device 20, a two-component developer, containing a toner and a carrier, is used as a developer. That is, in the developing device 20, the toner and the carrier are adjusted to have a desired mixing ratio, and further mixed and agitated to disperse uniformly the toner to prepare a developer having an optimum amount of charge. This developer is carried on the developing roller 45. When the developer is conveyed to a developing region facing the photoreceptor 40 by the rotation of the developing roller 45, the toner contained in the developer and carried on the developing roller 45 is transferred to the electrostatic latent image formed on the peripheral surface of the photoreceptor 40 so that the electrostatic latent image is developed.

The transfer device 30 is a conveying device that conveys the toner image formed by the developing device 20 to the transfer region 13 in which the toner image is transferred to the sheet 5. The transfer device 30 includes a transfer belt 31 to which the toner image is transferred from the photoreceptor 40, a suspension roller 34 which suspends the transfer belt 31, idle rollers 35 and 36, a drive roller 37 which drives the transfer belt 31, transfer rollers 32C, 32M, 32Y, and 32K which sandwich the transfer belt 31 together with the photoreceptors 40C, 40M, 40Y, and 40K, and a secondary transfer roller 33 which sandwiches the transfer belt 31 together with the drive roller 37.

The photoreceptors 40C, 40M, 40Y, and 40K are also called electrostatic latent image carriers, photosensitive drums, and the like. The photoreceptors 40C, 40M, 40Y, and 40K are provided for each color. Each photoreceptor 40 is provided along the moving direction of the transfer belt 31. The developing device 20, a charging device 41, an exposure unit 42, and a cleaning unit 43 are provided on the circumference of the photoreceptor 40.

The charging device 41 is a charging roller that contacts the photoreceptor 40 and uniformly charges the surface of the photoreceptor 40 according to a predetermined potential. The exposure unit 42 exposes the surface of the photoreceptor 40 charged by the charging device 41 according to the image to be formed on the sheet 5. Accordingly, a potential of a portion exposed by the exposure unit 42 on the surface of the photoreceptor 40 changes so that the electrostatic latent image is formed. The developing devices 20C, 20M, 20Y, and 20K develop the electrostatic latent image formed on the photoreceptor 40 by the toners supplied from toner tanks 18C, 18M, 18Y, and 18K and provided to face each developing device 20 to form the toner image. The toner tanks 18C, 18M, 18Y, and 18K are respectively filled with cyan, magenta, yellow, and black toners. The cleaning unit 43 collects the toner remaining on the photoreceptor 40 after the toner image formed on the photoreceptor 40 is transferred to the transfer belt 31.

The fixing device 50 fixes the toner image, secondarily transferred from the transfer belt 31 to the sheet 5, by passing the sheet 5 through a fixing nip region 14. The fixing device 50 includes a fixing belt 51, a pressing roller 52 which contacts the outer surface of the fixing belt 51, and a casing 53 which accommodates the fixing belt 51 and the pressing roller 52. The fixing belt 51 includes a heating element such as a heater. The fixing nip region 14 is formed between the fixing belt 51 and the pressing roller 52. When the sheet 5 passes through the fixing nip region 14, the toner image is melted and fixed to the sheet 5.

The discharge device 60 includes discharge rollers 62 and 64 which discharge the sheet 5 to the outside of the apparatus, the sheet 5 including the toner image fixed by the fixing device 50.

In some examples, the transfer device 30 of the image forming apparatus 1 may include a movable cleaning device 100. The movable cleaning device 100 removes the toner remaining on the transfer belt 31, which is the toner image conveying body. For example, the movable cleaning device 100 may be located at the downstream side of the transfer region 13, the upstream side of the transfer roller 32C, or the most upstream side to contact the transfer belt 31. The movable cleaning device 100 in FIG. 3 is shown to be located next to the suspension roller 34.

Figure 4:
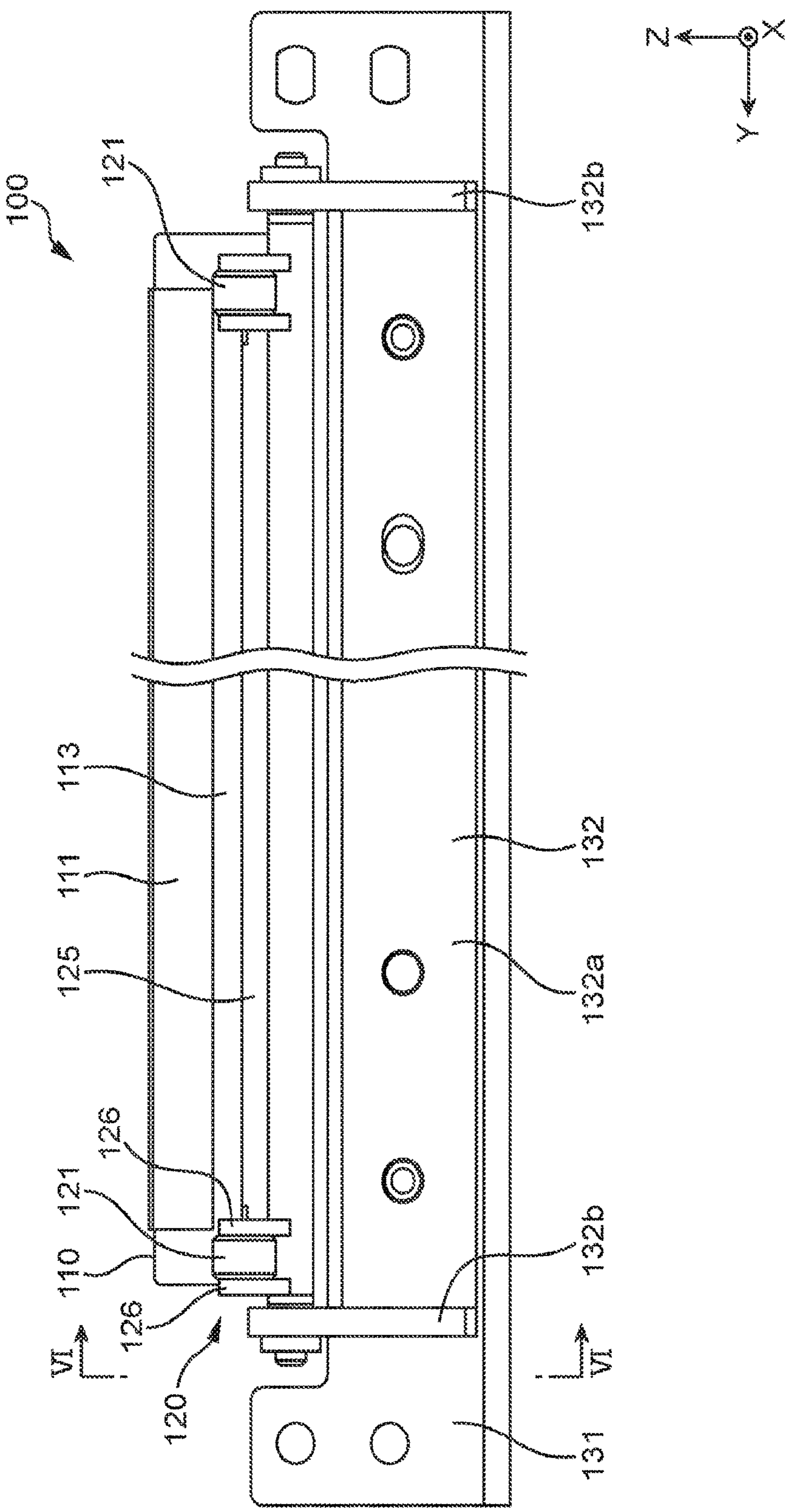
FIG. 4 is a front view showing an example movable cleaning device, in accordance with some examples.
Figure 5:
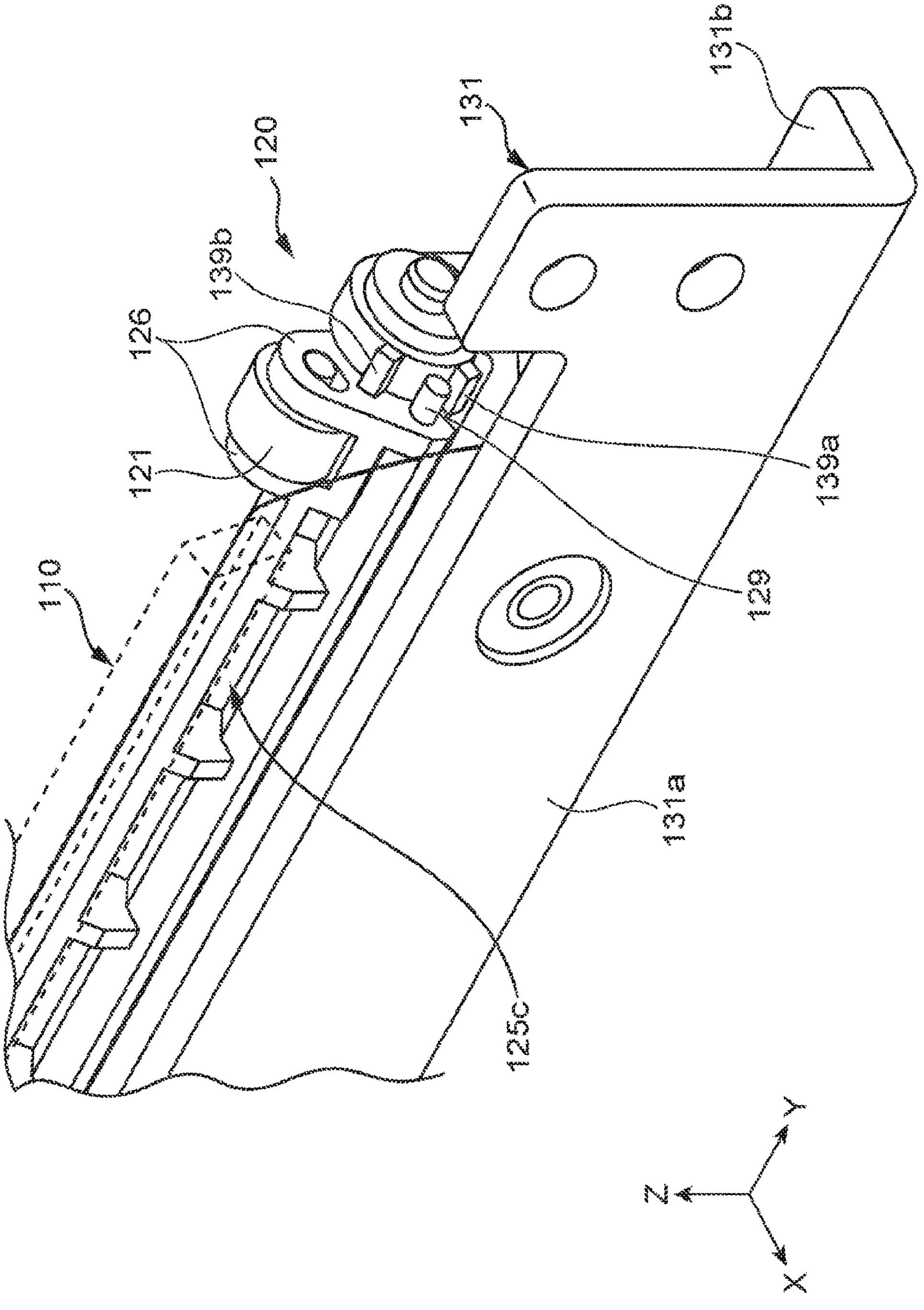
FIG. 5 is a perspective view showing an example movable cleaning device, in accordance with some examples.
Figure 6:
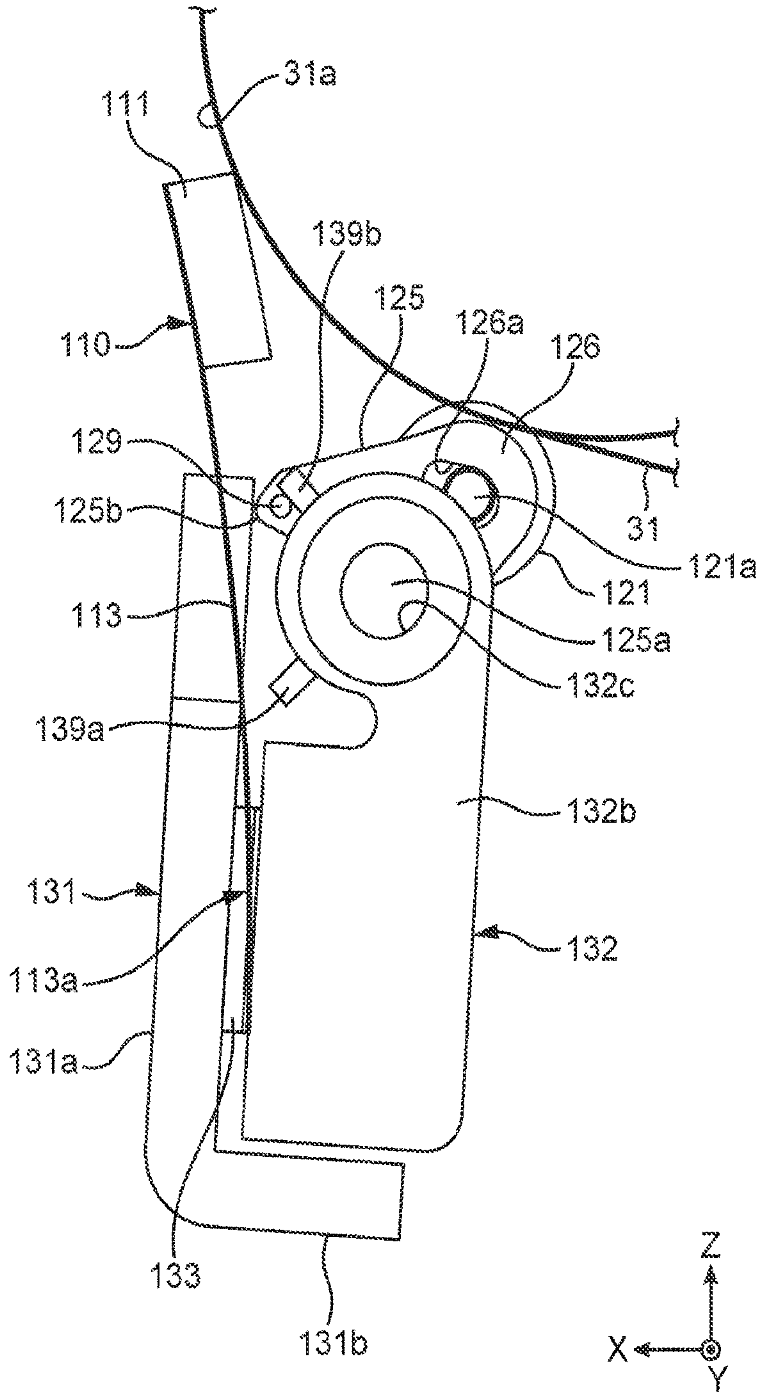
FIG. 6 is a cross-sectional view along a line VI-VI of FIG. 4, in accordance with some examples.
Figure 7:
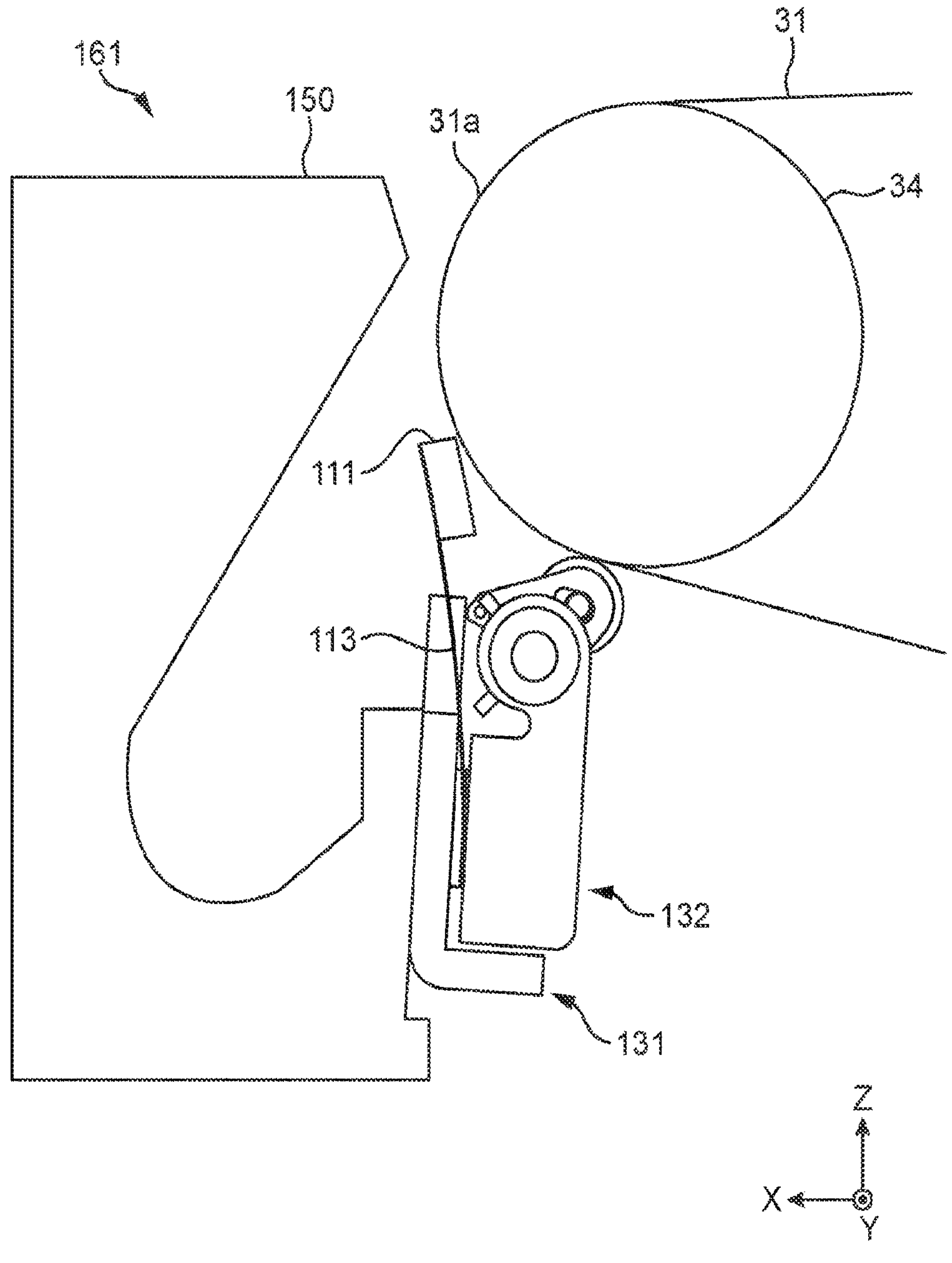
FIG. 7 is a schematic view of an example movable cleaning unit including a movable cleaning device, in accordance with some examples.

A front view of an example movable cleaning device is shown in FIG. 4, a perspective view of the example movable cleaning device is shown in FIG. 5, and a cross-sectional view taken along a line VI-VI of FIG. 4 is shown in FIG. 6. A schematic view of an example movable cleaning unit including the movable cleaning device is shown in FIG. 7. The example movable cleaning device 100 includes a contact member 110 and a lever device 120. The contact member 110 is to contact a rotation surface 31*a* in order to clean the rotation surface 31*a* of the transfer belt 31. As shown in FIG. 6, the rotation surface 31*a* is a surface of the transfer belt 31 to which a toner is transferred from the photoreceptor 40. For example, the contact member 110 can contact the transfer belt 31 at a position where the contact member 110 faces a part of the peripheral surface of the suspension roller 34. In the following description, when the toner image is fixed to the sheet 5 by the image forming apparatus 1, the rotation of the transfer belt 31 indicates the forward rotation, and the rotation of the transfer belt 31 in the opposite direction indicates the backward rotation.

The contact member 110 maintains either a contact state in which the contact member 110 contacts the transfer belt 31 or a separation state in which the contact member 110 separates from the transfer belt 31. The example contact member 110 may include a head 111 and an arm 113. The head 111 is movable between the contact state and the separation state. The head 111 may be, for example, a plate-shaped member that extends in the width direction of the transfer belt 31.

The arm 113 is fixed to and extends from the head 111. The arm 113 is operated by the lever device 120 to move the head 111. The example arm 113 is an elastic plate-shaped member and is held by a first holding member 131 and a second holding member 132.

The first holding member 131 and the second holding member 132 may be fixed to a bracket 150 accommodated inside the image forming apparatus 1 at a predetermined position, and may comprise a movable cleaning unit 161 together with the bracket 150 (see FIG. 7). In some examples in which the movable cleaning unit 161 is included in the image forming apparatus 1, the first holding member 131 and the second holding member 132 are arranged below the transfer belt 31. The contact member 110 is held by the first holding member 131 and the second holding member 132 so that the head 111 contacts the transfer belt 31 in a non-load state (natural state).

The first holding member 131 is L-shaped when viewed from the Y-axis direction as shown in FIG. 6 and includes a first plate-shaped portion 131*a* and a second plate-shaped portion 131*b*, which extend in the Y-axis direction of the transfer belt 31.

The second holding member 132 includes a third plate-shaped portion 132*a* which extends in the width direction of the transfer belt 31. The first plate-shaped portion 131*a* and the third plate-shaped portion 132*a* face each other. The second holding member 132 includes a protrusion piece 132*b*, which is located at both end portions of the third plate-shaped portion 132*a* and protrudes in the direction opposite to the first plate-shaped portion 131*a*.

As shown in FIG. 6, the arm 113 is located between the first plate-shaped portion 131*a* and the third plate-shaped portion 132*a* (see FIG. 4 for the third plate-shaped portion 132*a*). For example, the first plate-shaped portion 131*a* and the third plate-shaped portion 132*a* may be connected to each other by a connection member 133 such as a bolt and a rivet to face each other with a predetermined gap therebetween. For example, the distance between the first plate-shaped portion 131*a* and the third plate-shaped portion 132*a* may be larger than the thickness of the arm 113. The connection member 133 connects the first plate-shaped portion 131*a* and the third plate-shaped portion 132*a* at a predetermined position. In the arm 113, a through-hole 113*a* is formed at a position corresponding to the position of the connection member 133. The diameter of the through-hole 113*a* of the arm 113 may be slightly larger than the diameter of the connection member 133. When the connection member 133 is inserted through the through-hole 113*a* of the arm 113, the arm 113 is held between the first plate-shaped portion 131*a* and the third plate-shaped portion 132*a*.

The arm 113 may be or include a metallic plate member to have elasticity.

The material of the arm 113 is not limited to a metal, and may be or include any material having elasticity. For example, the arm 113 may be or include a resin material or the like. The head 111 may be or include a resinous plate member so that the transfer belt 31 is not damaged. The material of the head 111 is not limited to a resin material and may be or include, for example, a metal or the like.

The lever device 120 is to displace the contact member 110 in response to the rotation of the transfer belt 31. The example lever device 120 includes a roller 121 and a lever 125. The roller 121 is to contact the transfer belt 31. In an example, the pair of rollers 121 may be included to contact both ends of the transfer belt 31 in the width direction. In FIG. 5, the roller 121 at one end portion is shown.

The lever 125 is axially rotatable to contact the contact member 110. In some examples, the lever 125 may be supported by a pair of protrusion pieces 132*b* formed in the second holding member 132. In some examples, as shown in FIG. 6, the protrusion piece 132*b* of the second holding member 132 including a shaft hole 132*c* is to support the lever 125. The shaft hole 132*c* has, for example, a circular shape. The lever 125 includes a rotation shaft 125*a* corresponding to the shaft hole 132*c*. By inserting the rotation shaft 125*a* of the lever 125 through the shaft hole 132*c*, the lever 125 is rotatably supported.

Further, the lever 125 supports the roller 121 while allowing for the rotation of the roller 121. A pair of protrusion pieces 126 (see FIG. 4) is provided at both end portions of the lever 125 in the longitudinal direction. The protrusion piece 126 includes a hole 126*a* (see FIG. 6) for supporting the roller 121. A shaft 121*a* corresponding to the hole 126*a* is located at the center of the roller 121. For example, the roller 121 and the shaft 121*a* may be fixed to each other. By inserting the shaft 121*a* of the roller 121 through the hole 126*a*, the roller 121 is supported to be rotatable. The axial direction of the roller 121 is the same as the axial direction of the lever 125 and follows the Y-axis direction which is the width direction of the transfer belt 31.

As shown in FIGS. 5 and 6, the lever device 120 may include a first regulation member 139*a* and a second regulation member 139*b*. The first regulation member 139*a* and the second regulation member 139*b* are included in the protrusion piece 132*b* of the second holding member 132. The first regulation member 139*a* and the second regulation member 139*b* protrude radially around the shaft hole 132*c* and separate from each other in the circumferential direction. The lever 125 includes an engagement piece 129, which protrudes in the Y-axis direction. The engagement piece 129 is located between the first regulation member 139*a* and the second regulation member 139*b*. When the lever 125 rotates in the counterclockwise direction as viewed from the front of the paper surface of FIG. 6, the engagement piece 129 engages with the first regulation member 139*a* to regulate the rotation of the lever 125. Further, when the lever 125 rotates in the clockwise direction, the engagement piece 129 engages with the second regulation member 139*b* to regulate the rotation of the lever 125. In this way, the lever 125 swings in a predetermined angle range between the first regulation member 139*a* and the second regulation member 139*b*. In this angle range, the roller 121 supported by the lever 125 contacts the transfer belt 31.

Figure 8:
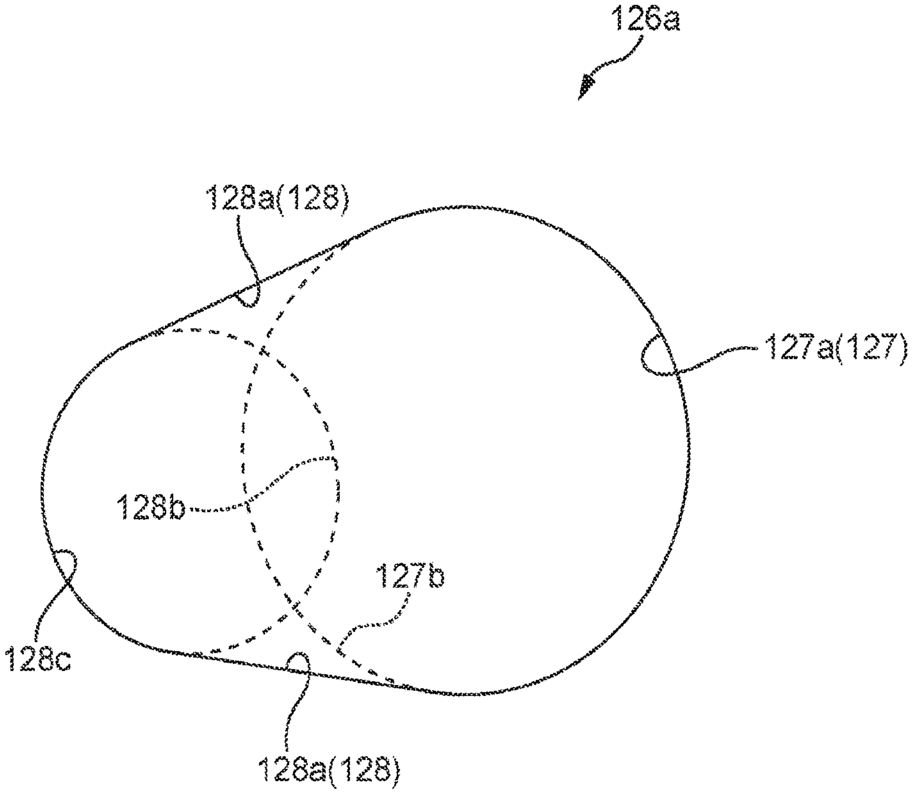
FIG. 8 is a schematic view illustrating an example of a hole of a lever for a movable cleaning device.

FIG. 8 is a diagram illustrating the hole 126*a* formed in the lever 125. The hole 126*a* supporting the roller 121 includes a low-friction region 127 and a high-friction region 128. The low-friction region 127 is a region having a small friction force with respect to the supported shaft 121*a* of the roller 121. The high-friction region 128 is a region in which a friction force with respect to the supported shaft 121*a* of the roller 121 is larger than the friction force in the low-friction region 127. The roller 121 is rotatable while the shaft 121*a* is located at the low-friction region 127. On the other hand, the rotation of the roller 121 is stopped or suppressed such that the shaft 121*a* engages with the hole 126*a* by the friction while the shaft 121*a* is located at the high-friction region 128.

In some examples, the hole 126*a* may be formed in an elongated hole shape.

This hole 126*a* may include a circular arc surface 127*a* which forms the low-friction region 127 and a tapered surface 128*a* which forms the high-friction region 128 from the circular arc surface 127*a*. For example, the hole 126*a* may include the circular arc surface 127*a* which forms a part of the circle 127*b* having a diameter corresponding to the shaft 121*a* of the roller 121 and the tapered surface 128*a*. The terminal end of the tapered surface 128*a* may be connected to the circular arc surface 128*c* forming a part of the circle 128*b* having a diameter smaller than that of the shaft 121*a* of the roller 121. For example, the distance from the center of the rotation shaft 125*a* of the lever 125 to the center of the circle 127*b* may be the same as the distance from the center of the rotation shaft 125*a* of the lever 125 to the center of the circle 128*b*.

Since the diameter of the circle 127*b* is slightly larger than the diameter of the shaft 121*a* of the roller 121, the shaft 121*a* of the roller 121 is rotatable while contacting the circular arc surface 127*a*. On the other hand, when the shaft 121*a* of the roller 121 deviates toward the circle 128*b*, the rotation of the shaft 121*a* of the roller 121 is stopped or suppressed by the frictional engagement between the tapered surfaces 128*a*. For example, when the transfer belt 31 rotates forward, the shaft 121*a* of the roller 121 may be pressed into the low-friction region 127 as the roller 121 moves to follow the rotation of the transfer belt 31. Further, when the transfer belt 31 rotates backward, the shaft 121*a* of the roller 121 may be pressed into the high-friction region 128 as the roller 121 moves to follow the rotation of the transfer belt 31.

In some examples, the lever 125 may include an edge portion 125*b* for pressing the contact member 110. The edge portion 125*b* extends along the width direction of the transfer belt 31, that is, the extension direction of the contact member 110. As viewed from the Y-axis direction, the distance from the center of the rotation shaft 125*a* to the edge portion 125*b* is larger than the shortest distance from the center of the rotation shaft 125*a* to the contact member 110. Therefore, when the lever 125 rotates, the edge portion 125*b* of the lever 125 contacts the contact member 110, and the contact member 110 can be displaced. In an example, since the arm 113 of the contact member 110 is deformed by the pressing of the edge portion 125*b*, the head 111 of the contact member 110 may be displaced.

The lever 125 includes a concave portion 125*c* which collects a remaining toner removed from the transfer belt 31 by the contact member 110. For example, the concave portion 125*c* may be adjacent to the edge portion 125*b*. The concave portion 125*c* may extend along the width direction of the transfer belt 31. The concave portion 125*c* opens toward the radial direction such that the concave portion 125*c* collects the remaining toner, when the rotation shaft 125*a* is at the center. The head 111 of the contact member 110 may be located above the opening of the concave portion 125*c*.

Figure 9:
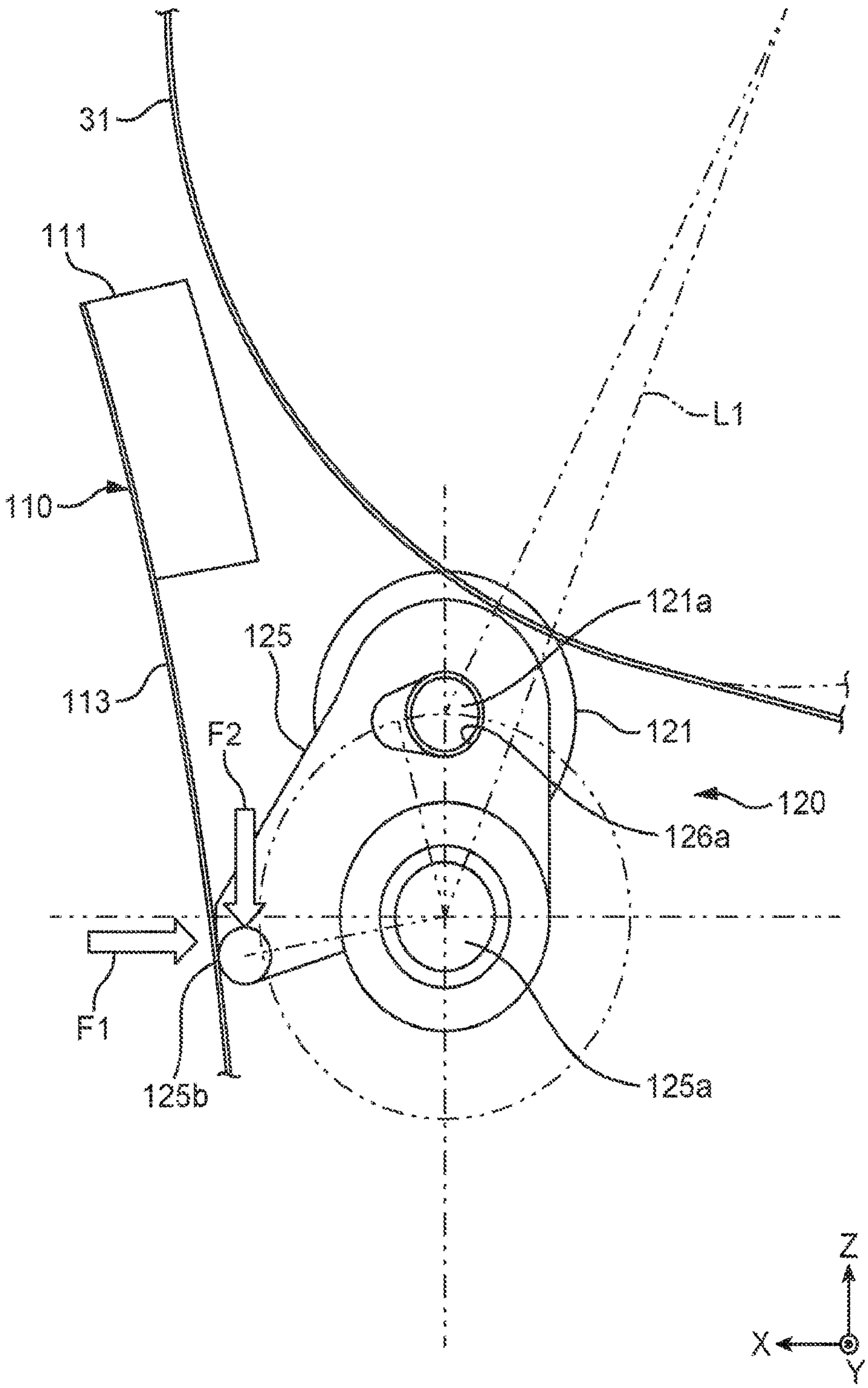
FIG. 9 is a schematic diagram illustrating an operation of an example movable cleaning device.
Figure 10:
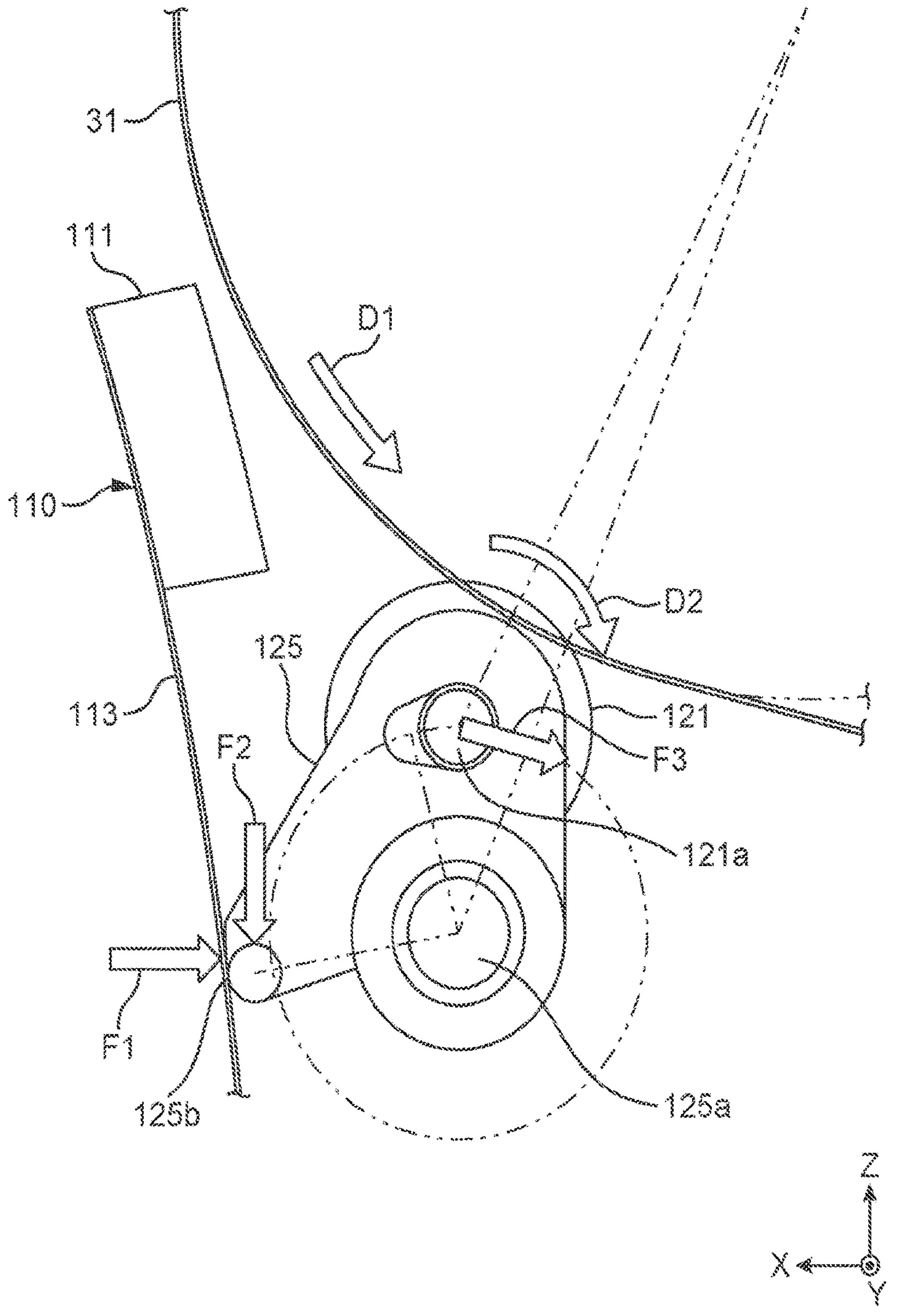
FIG. 10 is a schematic diagram illustrating an operation of an example movable cleaning device.
Figure 11:
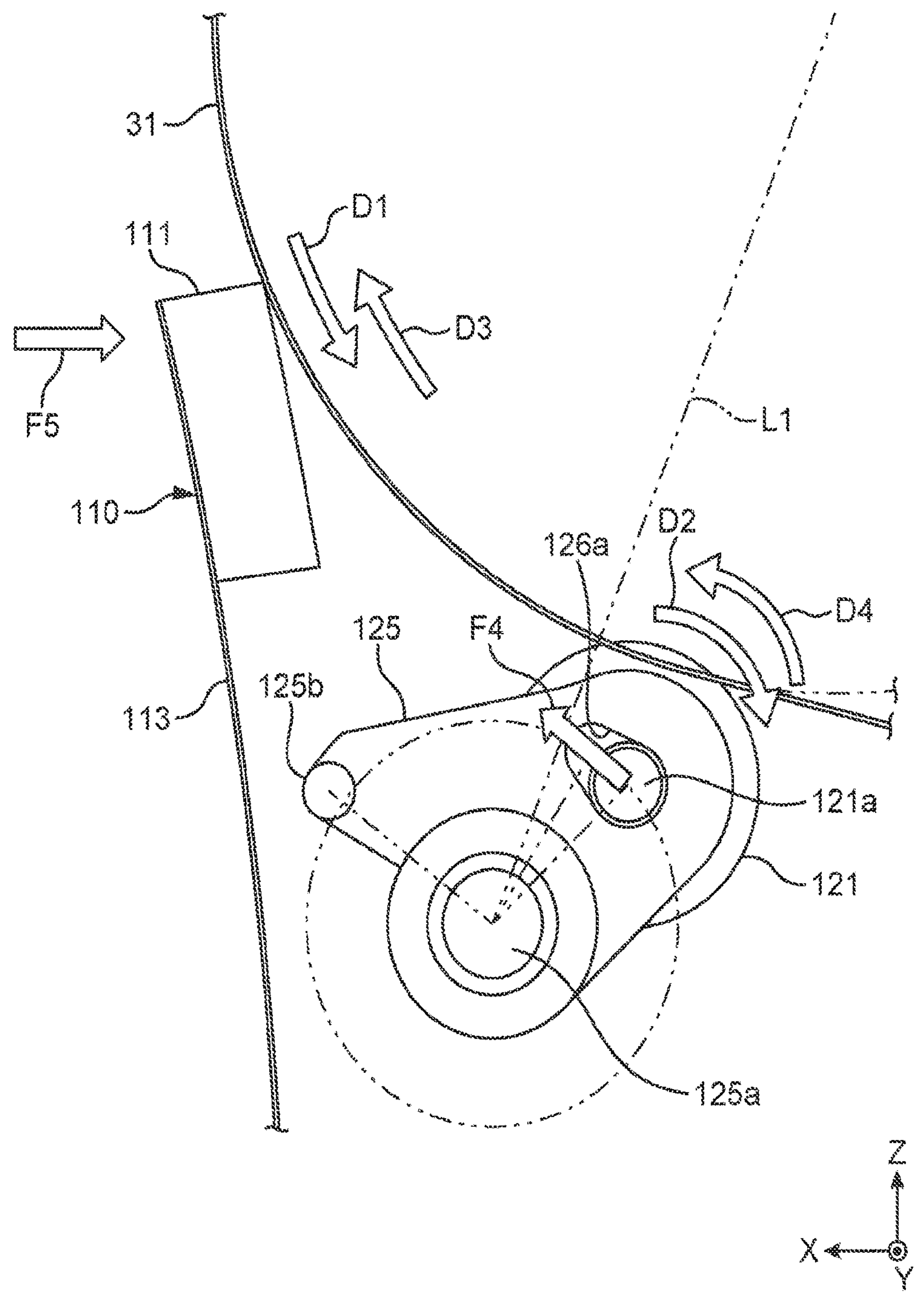
FIG. 11 is a schematic diagram illustrating an operation of an example movable cleaning device.

Hereinafter, the operation of the movable cleaning device is described. FIGS. 9 to 11 are schematic views illustrating the operation of the example cleaning device. In FIGS. 9 to 11, the detail (for example, the engagement piece 129 or the like) of the lever device is omitted. FIG. 9 shows a state in which the contact member 110 separates from the transfer belt 31. In this state, the lever 125 is stopped while the engagement piece 129 contacts the first regulation member 139*a* (see FIG. 6). The edge portion 125*b* of the lever 125 presses the contact member 110 so that the contact member 110 separates from the transfer belt 31. In the example shown in FIG. 9, the edge portion 125*b* presses the arm 113 of the contact member 110. In this state, the lever 125 is pressed against the contact member 110 in response to the pressing of the contact member 110 by the lever 125.

In the example shown in FIG. 10, the contact member 110 is located at the left side of the lever 125 as viewed from the front of the paper surface, and the contact member 110 presses the lever 125 at a position lower than the rotation shaft 125*a* of the lever 125. The vector of a pressing force F1 by the contact member 110 is directed below the rotation center of the lever 125. Therefore, the pressing force F1 by the contact member 110 generates a force F2 that causes the lever 125 to rotate in the counterclockwise direction. Since the rotation of the lever 125 is regulated by the first regulation member 139*a* (see FIG. 6), the rotation position of the lever 125 is held. As shown in FIG. 9, the shaft 121*a* of the roller 121 is located in the counterclockwise direction in relation to an imaginary line L1 connecting the rotation shaft 125*a* and the rotation center of the suspension roller 34 when the contact member 110 is in the separation state. In the example shown in FIG. 9, the shaft 121*a* is located just above the rotation shaft 125*a*.

FIG. 10 shows a state in which the transfer belt 31 starts to rotate forward when the contact member 110 separates from the transfer belt 31. In FIG. 10, the rotation directions of the transfer belt 31 and the roller 121 during the forward rotation of the transfer belt 31 are respectively indicated by the arrows D1 and D2. When the transfer belt 31 rotates forward, the lever 125 displaces the contact member 110 to a position in which the contact member 110 contacts the transfer belt 31 by receiving the force of the transfer belt 31 transmitted to the lever 125 by the friction force of the roller 121. In this case, a force generated by the transfer belt 31 is transmitted to the lever 125 by the friction force between the shaft 121*a* of the roller 121 and the hole of the lever 125. By a force F3 transmitted from the transfer belt 31 to the lever 125 through the roller 121, the lever 125 rotates clockwise against the friction force between the rotation shaft 125*a* of the lever 125 and the shaft hole 132*c*.

The force F3 that rotates the lever 125 clockwise is larger than the force F2 that rotates the lever 125 counterclockwise by the contact member 110. Thus, the lever 125 rotates clockwise against the pressing force of the contact member 110. When the edge portion 125*b* of the lever 125 separates from the arm 113 of the contact member 110 as the lever 125 rotates, the contact member 110 is located at a position in which the contact member 110 contacts the transfer belt 31 by the elastic force of the arm 113.

In FIG. 11, shown is a state in which the contact member 110 contacts the transfer belt 31. In this state, the lever 125 is stopped while the engagement piece 129 contacts the second regulation member 139*b* (see FIG. 6). The head 111 of the contact member 110 presses the transfer belt 31 by a predetermined force F5 based on the elastic force of the arm 113. In a state in which the transfer belt 31 rotates forward, the roller 121 rotates clockwise to follow the transfer belt 31. In this state, the shaft 121*a* of the roller 121 is displaced to the circular arc surface 127*a* (i.e., the low-friction region 127).

Since the low-friction region 127 deviates clockwise from the high-friction region 128, the position of the roller 121 is held by the low-friction region 127 when the roller 121 rotates clockwise. As shown in FIG. 11, the shaft 121*a* of the roller 121 is located in the clockwise direction in relation to the imaginary line L1 connecting the rotation shaft 125*a* and the rotation center of the suspension roller 34 when the contact member 110 is in the contact state.

In FIG. 11, the transfer belt 31 starts to rotate backward, and the rotation direction of the transfer belt 31 and the rotation direction of the roller 121 are respectively indicated by the arrows D3 and D4. When the transfer belt 31 starts to rotate backward while the contact member 110 contacts the transfer belt 31, the lever 125 displaces the contact member 110 to a position in which the contact member separates from the transfer belt 31 by receiving a force of the transfer belt 31 transmitted to the lever 125 by the friction force of the roller 121. In this case, a force generated by the rotation of the transfer belt 31 is transmitted to the lever 125 by the friction force between the shaft 121*a* of the roller 121 and the hole of the lever 125. When the transfer belt 31 rotates backward, the roller 121 rotates counterclockwise to follow the transfer belt 31. In this state, the shaft 121*a* of the roller 121 is displaced to the tapered surface 128*a* (i.e., the high-friction region 128). Therefore, the force generated by the rotation of the transfer belt 31 is efficiently transmitted to the lever 125.

By the force F4 transmitted from the transfer belt 31 to the lever 125 through the roller 121, the lever 125 rotates counterclockwise by the friction force between the rotation shaft 125*a* of the lever 125 and the shaft hole 132*c*. The force F4 that rotates the lever 125 counterclockwise is larger than the force F5 which the contact member 110 exerts on the transfer belt 31. Thus, the lever 125 can displace the contact member 110 to a position in which the contact member separates from the transfer belt 31 against the pressing force of the contact member 110. Accordingly, the contact member 110 returns to the state of FIG. 9.

As described above, when the transfer belt 31 is controlled to print the toner image on the sheet 5, the transfer belt 31 rotates forward and the contact member 110 contacts the transfer belt 31. In some examples, the transfer belt 31 may be controlled to stop after the transfer belt 31 is rotated backward at a predetermined timing after the printing operation control ends. In this case, the contact member 110 separates from the transfer belt 31 when the operation of the image forming apparatus 1 is stopped.

Figure 12:
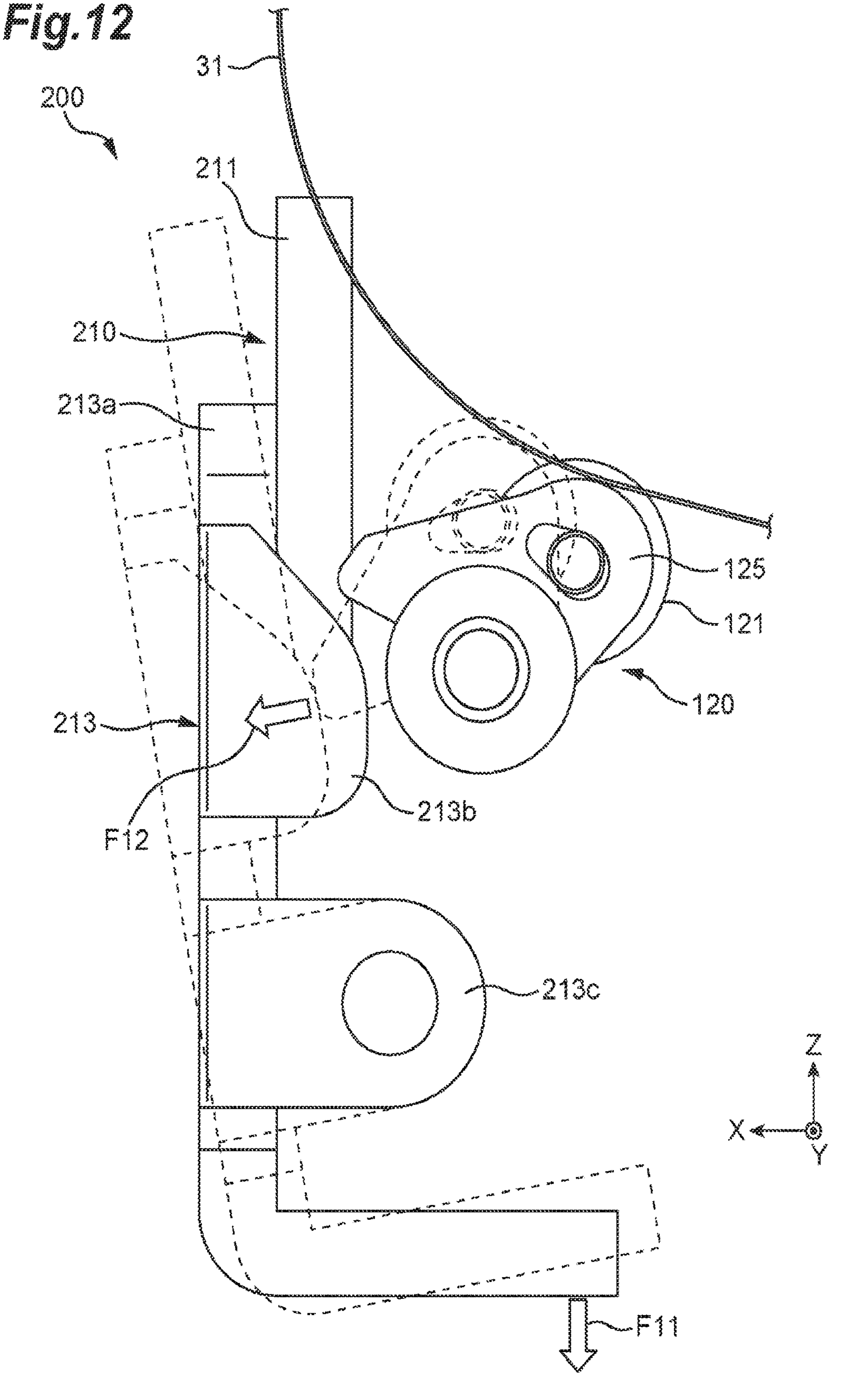
FIG. 12 is a schematic diagram illustrating an operation of an example movable cleaning device.

In some examples, the movable cleaning device may be modified. Hereinafter, differences between the movable cleaning device 100 and a modified device are described with the overlapping description omitted. FIG. 12 is a diagram showing a movable cleaning device 200 in accordance with some examples. The movable cleaning device 200 includes the lever device 120 and a contact member 210. The contact member 210 includes a head 211 which contacts the transfer belt 31 similarly to the head 111. The contact member 210 includes a support member 213 that supports the head 211, instead of the arm 113.

The support member 213 includes a plate-shaped portion 213*a* to which the head 211 is fixed, a pressing piece 213*b* which protrudes from the plate-shaped portion 213*a* toward the lever device 120, and a support piece 213*c* which protrudes from both ends of the plate-shaped portion 213*a* in the longitudinal direction. The plate-shaped portion 213*a* extends along the width direction of the transfer belt 31. The pressing piece 213*b* is located at a position overlapping the lever 125 in the width direction of the transfer belt 31. The support piece 213*c* is rotatably supported by, for example, a bracket or the like constituting the movable cleaning unit. The support member 213 is pushed by a pushing member such as a spring so that a force F11 is exerted in the clockwise direction.

Referring to the movable cleaning device 200, the lever 125 separates from the pressing piece 213*b* when the transfer belt 31 rotates forward. In this state, the head 211 contacts the transfer belt 31 as the support member 213 is displaced clockwise by the force F11 of the pushing member. On the other hand, when the transfer belt 31 rotates backward, the lever 125 rotates counterclockwise so that the lever 125 presses the pressing piece 213*b*. Since a force F12 which the lever 125 exerts on the pressing piece 213*b* is larger than the pushing force F11 of the pushing member, the support member 213 rotates counterclockwise against the pushing member. Accordingly, the head 211 separates from the transfer belt 31.

Figure 13:
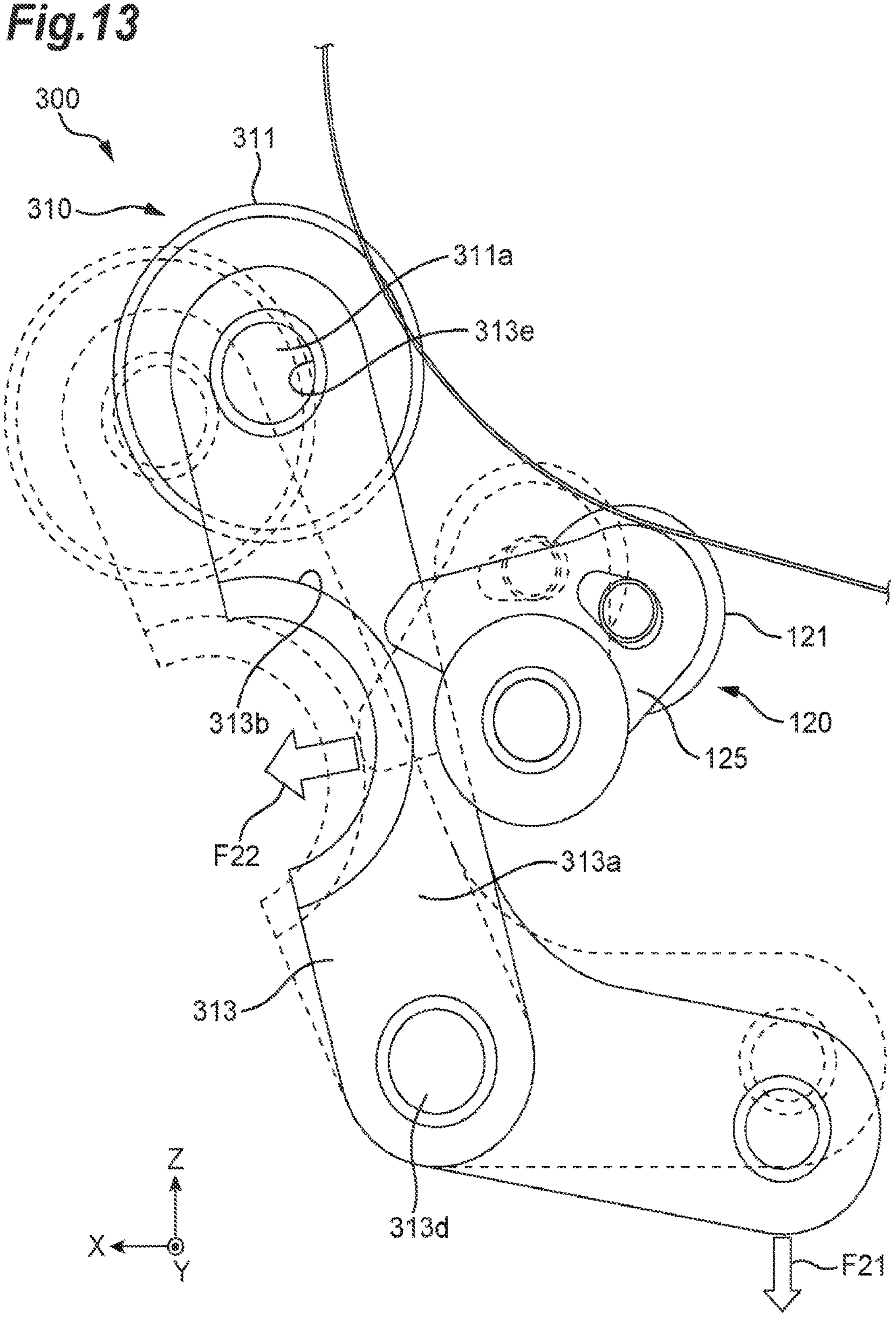
FIG. 13 is a schematic diagram illustrating an operation of an example movable cleaning device.

FIG. 13 shows a diagram illustrating a movable cleaning device 300 in accordance with some examples. The movable cleaning device 300 includes the lever device 120 and a contact member 310. The contact member 310 includes a roller head 311 which contacts the transfer belt 31 similarly to the head 111. The axial direction of the roller head 311 follows the width direction of the transfer belt 31. The roller head 311 has a length approximately equal to the width of the transfer belt 31. A support member 313 that supports the roller head 311 includes a pair of side plate portions 313*a* which rotatably supports the roller head 311 from both ends, a pressing portion 313*b* which protrudes from the side plate portion 313*a*, and a shaft portion 313*d* which protrudes from the side plate portion 313*a*.

The side plate portion 313*a* includes a shaft hole 313*e* which receives a rotating shaft 311*a* of the roller head 311. The pair of side plate portions 313*a* is respectively arranged at both ends of the roller head 311 in the axial direction and supports the roller head 311. Each pressing portion 313*b* protrudes outward in the axial direction from the pair of side plate portions 313*a*. The pressing portion 313*b* may be, for example, an arc shape. The shaft portion 313*d* is rotatably supported by, for example, a bracket or the like constituting the movable cleaning unit. The support member 313 is pushed by an pushing member such as a spring so that a force F21 is exerted in the clockwise direction.

Referring to the movable cleaning device 300, when the transfer belt 31 rotates forward, the lever 125 separates from the pressing portion 313*b*. In this state, the support member 313 is displaced clockwise by the force F21 of the pushing member so that the roller head 311 contacts the transfer belt 31. When the roller head 311 contacts the transfer belt 31, the roller head 311 removes a remaining toner on the surface of the transfer belt 31 while rotating in response to the rotation of the transfer belt 31. When the transfer belt 31 rotates backward, the lever 125 rotates counterclockwise so that the lever 125 presses the pressing portion 313*b*. Since a force F22 which the lever 125 exerts on the pressing piece 213*b* is larger than the pushing force F21 of the pushing member, the support member 313 rotates counterclockwise against the pushing member. Accordingly, the roller head 311 separates from the transfer belt 31.

As described above, in some examples, the movable cleaning device 100 may include the contact member 110 that cleans the transfer belt 31 and the lever device 120 which displaces the contact member 110. The lever device 120 includes the roller 121 which can contact the transfer belt 31 and the lever 125 which supports the roller 121 to rotate in response to the forward rotation of the transfer belt 31. The lever 125 is axially supported to be rotatable. When the transfer belt 31 rotates forward, the lever 125 displaces the contact member 110 to a position in which the contact member contacts the transfer belt 31 by receiving the force of the transfer belt 31 transmitted to the lever 125 by the friction force of the roller 121. When the transfer belt 31 rotates backward, the lever 125 displaces the contact member 110 to a position in which the contact member 110 separates from the transfer belt 31 by receiving the force of the transfer belt 31 transmitted to the lever 125 by the friction force of the roller 121.

In some examples, the transfer device 30, which is an example conveying device, may include the transfer belt 31, the contact member 110 that is displaceable between the contact state (i.e., the contact member contacts the transfer belt 31) and the separation state (i.e., the contact member separates from the transfer belt 31), the roller 121 which contacts the transfer belt 31, and the lever 125 which displaces the contact member 110 and includes the rotation shaft 125*a* fixed in the shaft hole 132*c*. The lever 125 includes the hole 126*a* which supports the shaft 121*a* of the roller 121. When the transfer belt 31 rotates forward, the lever 125 displaces the contact member 110 to the contact state against the friction force between the rotation shaft 125*a* of the lever 125 and the shaft hole 132*c* by receiving the force of the transfer belt 31 transmitted to the lever 125 by the friction force between the shaft 121*a* of the roller 121 and the hole 126*a* of the lever 125. When the transfer belt 31 rotates backward, the lever 125 displaces the contact member 110 to the separation state against the friction force between the rotation shaft 125*a* of the lever 125 and the shaft hole 132*c* by receiving the force of the transfer belt 31 transmitted to the lever 125 by the friction force between the shaft 121*a* of the roller 121 and the hole 126*a* of the lever 125.

The example image forming apparatus 1 may include the transfer belt 31, the contact member 110 that is displaceable between the contact state (i.e., the contact member contacts the transfer belt 31) and the separation state (i.e., the contact member separates from the transfer belt 31), the roller 121 which contacts the transfer belt 31, and the lever 125 which displaces the contact member 110. The lever 125 includes the rotation shaft 125*a* which is fixed in the shaft hole 132*c*. The lever 125 includes the hole 126*a* which supports the shaft 121*a* of the roller 121. When the transfer belt 31 rotates forward, the lever 125 displaces the contact member 110 to the contact state against the friction force between the rotation shaft 125*a* of the lever 125 and the shaft hole 132*c* by receiving the force of the transfer belt 31 transmitted to the lever 125 by the friction force between the shaft 121*a* of the roller 121 and the hole 126*a* of the lever 125. When the transfer belt 31 rotates backward, the lever 125 displaces the contact member 110 to the separation state against the friction force between the rotation shaft 125*a* of the lever 125 and the shaft hole 132*c* by receiving the force of the transfer belt 31 transmitted to the lever 125 by the friction force between the shaft 121*a* of the roller 121 and the hole 126*a* of the lever 125.

In the movable cleaning device 100, the roller 121 pushes the lever 125 by receiving a force from the transfer belt 31 in response to each of the forward rotation and the backward rotation of the transfer belt 31. The contact member 110 contacts the transfer belt 31 in a state in which the transfer belt 31 rotates forward, and the contact member 110 separates from the transfer belt 31 in a state in which the transfer belt 31 rotates backward. Since the contact member 110 contacts the transfer belt 31 in response to the forward rotation of the transfer belt 31, the constant contact of the contact member 110 with respect to the transfer belt 31 can be avoided. Further, since the lever device 120 uses the roller 121 to transmit the force of the transfer belt 31 to the lever 125, the friction between the transfer belt 31 and the lever device 120 is suppressed. As described above, the movable cleaning device 100 can remove the remaining toner of the transfer belt 31 while suppressing the damage or the like of the transfer belt 31.

In some examples, the lever 125 may include the hole 126*a* which supports the shaft 121*a* of the roller 121 to be rotatable. The hole 126*a* can have the low-friction region 127 in which the roller 121 is rotated in response to the forward rotation of the transfer belt 31 and the high-friction region 128 in which the roller 121 engages with the lever 125 by the friction in response to the backward rotation of the transfer belt 31. In this configuration, when the transfer belt 31 rotates forward, the roller 121 which contacts the transfer belt 31 easily rotates, and the friction between the transfer belt 31 and the roller 121 is reduced. When the transfer belt 31 rotates backward, the roller 121 engages the lever 125 by friction, and the force of the transfer belt 31 is easily transmitted to the lever 125.

In some examples, the lever 125 may be to press the shaft 121*a* of the roller 121 into the low-friction region 127 in response to the forward rotation of the transfer belt 31 and may be to press the shaft 121*a* of the roller 121 into the high-friction region 128 in response to the backward rotation of the transfer belt 31. In this configuration, the shaft 121*a* does not easily move from the low-friction region 127 during the forward rotation, and the shaft 121*a* does not easily move from the high-friction region during the backward rotation.

In some examples, the hole 126*a* may be an elongated hole shape to include the circular arc surface 127*a* which forms the low-friction region 127 and the tapered surface 128*a* which forms the high-friction region 128 from the circular arc surface 127*a*. In this configuration, the shaft 121*a* does not easily move from the low-friction region 127 during the forward rotation, and the shaft 121*a* does not easily move from the high-friction region during the backward rotation.

In some examples, the contact member 110 may include the head 111 which is movable between the contact state (i.e., the contact member contacts the transfer belt 31) and the separation state (i.e., the contact member separates from the transfer belt 31) and the arm 113 which is operated by the lever 125 to move the head 111 and extends from the head 111. In this configuration, the contact member 110 can be easily manufactured.

In some examples, the lever 125 may include the concave portion 125*c* which collects the remaining toner removed from the transfer belt 31 by the contact member 110. Since the removed toner can be collected by the concave portion 125*c*, the diffusion of the toner is suppressed. In some examples, the remaining toner falls into the concave portion 125*c* when the contact member 110 shifts from the contact state to the separation state.

In some examples, the contact member 110 may press the lever 125 by a predetermined force F2 (first pressing force) to hold the rotation position of the lever 125 while being displaced to a position in which the contact member separates from the transfer belt 31, and the lever 125 may displace the contact member 110 to a position in which the contact member contacts the transfer belt 31 against the force F2 of the contact member 110 when the transfer belt 31 rotates forward. In this configuration, it is possible to easily maintain a state in which the contact member 110 separates from the transfer belt 31.

In some examples, the contact member 110 may press the transfer belt 31 by a predetermined force F5 (second pressing force) while being displaced to a position in which the contact member contacts the transfer belt 31, and the lever 125 can displace the contact member 110 to a position in which the contact member separates from the transfer belt 31 against the force F5 of the contact member 110 when the transfer belt 31 rotates backward. In this configuration, the contact member 110 can contact the transfer belt 31 by a constant force, and the contact member 110 can be easily controlled in the separation state by rotating the transfer belt 31 backward.

In some examples, the contact member 110 may press the lever 125 at the lower position of the rotation shaft 125*a* of the lever 125 while the contact member is displaced to a position in which the contact member separates from the transfer belt 31. In this configuration, the rotation position of the lever 125 can be easily held.

In some examples, the transfer belt 31 may rotate forward when the transfer belt 31 is controlled to print the toner image on the sheet 5. That is, the remaining toner on the transfer belt 31 can be removed when the printing operation is executed.

The transfer belt 31 may be controlled to rotate backward at a predetermined timing after the printing operation control. In this configuration, since the contact member 110 separates from the transfer belt 31 after the printing ends, the damage of the transfer belt 31 due to the contact member 110 is suppressed. Controlling the transfer belt 31 to rotate backward may be immediately after the printing operation or after a predetermined time of the printing operation elapses. Further, controlling the transfer belt 31 to rotate backward may be executed when the power of the image forming apparatus 1 is turned off.

It should be understood that aspects, advantages, and features described herein are not necessarily achieved or included in any one particular example. Indeed, although various examples have been described and shown herein, it should be apparent that other examples may be possible in terms of, for example, arrangement, substitution, combination, and/or configuration. All corrections or modifications included in the scope of the disclosed subject matter may be claimed.

For example, controlling the transfer belt 31 to rotate backward may be executed when replacing the movable cleaning unit. In this case, the transfer belt 31 is suppressed from being damaged by the contact member of the removed movable cleaning unit.

In some examples, the contact member and the lever device capable of contacting the transfer belt have been described, but the contact member and the lever device may be provided to contact a device having another rotation surface.

In some examples, the roller 121 that is rotatable clockwise and counterclockwise has been described, but the roller supported by the lever may have a mechanism that allows for the clockwise rotation. For example, the roller may include a one-way clutch.

What is claimed is:

1. A movable cleaning device comprising:
a contact member to clean a rotation surface; and
a lever device comprising:
a roller contacting the rotation surface; and
a lever axially supported to be rotatable, the lever to:
support the roller to rotate in response to a rotation of the rotation surface;
displace the contact member to a first state in which the contact member contacts the rotation surface, in response to a rotation of the rotation surface in a first direction; and
displace the contact member to a second state in which the contact member separates from the rotation surface, in response to a rotation of the rotation surface in a second direction.

2. The movable cleaning device of claim 1, wherein:
the lever comprises a hole to support a shaft of the roller to be rotatable, the hole comprising:
a low-friction region in which the roller rotates in response to the rotation of the rotation surface in the first direction; and
a high-friction region in which the roller engages with the lever in response to the rotation of the rotation surface in the second direction.

3. The movable cleaning device of claim 2, wherein:
the lever is to:
press the shaft of the roller into the low-friction region in response to the rotation of the rotation surface in the first direction; and
press the shaft of the roller into the high-friction region in response to the rotation of the rotation surface in the second direction.

4. The movable cleaning device of claim 2, wherein:
the hole is an elongated hole shape, the hole comprising:
a circular arc surface in the low-friction region; and
a tapered surface in the high-friction region.

5. The movable cleaning device of claim 1, wherein:
the contact member comprises:
a head which is to be movable between the first state and the second state; and
an arm that extends from the head, the arm to move the head.

6. The movable cleaning device of claim 1, wherein:
the rotation surface comprises a transfer belt to which a toner is transferred; and
the lever comprises a concave portion to collect a remaining toner removed from the transfer belt by the contact member.

7. The movable cleaning device of claim 1, wherein:
the contact member in the second state is to press the lever by a first pressing force to hold a rotation position of the lever; and
the lever is to displace the contact member to the first state against the first pressing force in response to the rotation of the rotation surface in the first direction.

8. The movable cleaning device of claim 7, wherein:
the contact member in the first state is to press the rotation surface by a second pressing force; and
the lever is to displace the contact member to the second state against the second pressing force in response to the rotation of the rotation surface in the second direction.

9. The movable cleaning device of claim 1, wherein:
the contact member in the second state is to press the lever at a lower portion of a rotation shaft of the lever.

10. A conveying device comprising:
a conveying body comprising a rotation surface;
a contact member which is to be movable between a contact state and a separation state, wherein the contact state indicates that the contact member contacts the rotation surface of the conveying body, and the separation state indicates that the contact member separates from the rotation surface;
a roller contacting the rotation surface; and
a lever comprising:
a rotation shaft fixed in a shaft hole to displace the contact member; and
a hole to support a shaft of the roller,
the lever to:
support the roller to rotate in response to a rotation of the rotation surface;
displace the contact member to the contact state against a friction force between the rotation shaft and the shaft hole in response to a rotation of the rotation surface in a first direction; and
displace the contact member to the separation state against the friction force between the rotation shaft and the shaft hole in response to a rotation of the rotation surface in a second direction.

11. The conveying device of claim 10, wherein:
the hole comprises:
a low-friction region for rotating the roller in response to the rotation of the rotation surface in the first direction; and
a high-friction region for suppressing the rotation of the roller in response to the rotation of the rotation surface in the second direction.

12. The conveying device of claim 10, wherein:
the contact member in the separation state is to press the lever by a first pressing force to hold a rotation position of the lever; and
the contact member in the contact state is to press the rotation surface by a second pressing force, wherein:
the lever is to displace the contact member to the first state against the first pressing force in response to the rotation of the rotation surface in the first direction; and
the lever is to displace the contact member to the second state against the second pressing force in response to the rotation of the rotation surface in the second direction.

13. An image forming apparatus comprising:
a conveying body comprising a rotation surface;
a contact member which is to be movable between a contact state and a separation state, wherein the contact state indicates that the contact member contacts the rotation surface of the conveying body, and the separation state indicates that the contact member separates from the rotation surface;

a roller contacting the rotation surface; and a lever comprising:

a rotation shaft fixed in a shaft hole; and a hole to support a shaft of the roller, the lever to:

support the roller to rotate in response to a rotation of the rotation surface;

displace the contact member to the contact state against a friction force between the rotation shaft and the shaft hole in response to a rotation of the rotation surface in a first direction; and displace the contact member to the separation state against the friction force between the rotation shaft and the shaft hole in response to a rotation of the rotation surface in a second direction.

14. The image forming apparatus of claim 13, wherein:

the conveying body comprises a transfer belt to which a toner is transferred; and the transfer belt rotates in the first direction, when the transfer belt is controlled to print a toner image on a medium.

15. The image forming apparatus of claim 14, wherein:

the transfer belt rotates in the second direction in a predetermined period of time after the transfer belt is controlled to print the toner image on the medium.

* * * * *